(12) United States Patent
Onishi

(10) Patent No.: US 8,964,199 B2
(45) Date of Patent: Feb. 24, 2015

(54) IMAGE FORMING APPARATUS

(71) Applicant: KYOCERA Document Solutions Inc., Osaka-shi (JP)

(72) Inventor: Yuzo Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 40 days.

(21) Appl. No.: 13/846,489

(22) Filed: Mar. 18, 2013

(65) Prior Publication Data

US 2013/0250334 A1    Sep. 26, 2013

(30) Foreign Application Priority Data

Mar. 22, 2012   (JP) ................................ 2012-064788

(51) Int. Cl.
    *H04N 1/00*   (2006.01)
    *B41J 13/10*   (2006.01)
    *B65H 31/24*   (2006.01)

(52) U.S. Cl.
    CPC ....... *H04N 1/00631* (2013.01); *H04N 1/00633* (2013.01); *B41J 13/106* (2013.01); *B65H 31/24* (2013.01); *H04N 2201/0094* (2013.01); *B65H 2405/1114* (2013.01); *B65H 2405/331* (2013.01); *B65H 2801/06* (2013.01)
    USPC ....... 358/1.13; 399/405; 270/58.34; 271/293; 271/306

(58) Field of Classification Search
    None
    See application file for complete search history.

(56) References Cited

U.S. PATENT DOCUMENTS

| 4,073,487 | A | * | 2/1978 | Schirrmeister et al. ........ 271/279 |
| 4,867,437 | A | * | 9/1989 | Wise ............................. 271/291 |
| 5,344,130 | A | * | 9/1994 | Suzuki et al. ................. 270/58.02 |
| 5,390,907 | A | * | 2/1995 | Dole .............................. 271/214 |
| 5,478,061 | A | * | 12/1995 | Murakami et al. .......... 270/58.08 |
| 5,971,394 | A | * | 10/1999 | Kida et al. ..................... 271/303 |
| 6,112,047 | A | * | 8/2000 | Kato et al. ..................... 399/381 |
| 8,152,163 | B2 | * | 4/2012 | Kitan ............................. 271/207 |
| 2002/0141800 | A1 | * | 10/2002 | Fuchi et al. .................... 399/388 |
| 2003/0185612 | A1 | * | 10/2003 | Sekiyama et al. ............. 399/405 |

(Continued)

FOREIGN PATENT DOCUMENTS

| JP | S63-90655 U | 6/1988 |
| JP | H03-44165 U | 4/1991 |
| JP | 10-069137 A | 3/1998 |
| JP | 2000-247550 A | 9/2000 |
| JP | 2002-068567 A | 3/2002 |
| JP | 2003-073009 A | 3/2003 |
| JP | 2003-312937 A | 11/2003 |
| JP | 2004-051240 A | 2/2004 |

OTHER PUBLICATIONS

Notice of Reasons for Rejection issued to JP Application No. 2012-064788, mailed Jun. 17, 2014.

*Primary Examiner* — King Poon
*Assistant Examiner* — Ted Barnes
(74) *Attorney, Agent, or Firm* — Knobbe Martens Olson & Bear LLP

(57) ABSTRACT

An image forming apparatus includes a main conveyance path 13, a main discharge roller 17, and a main stacking tray 19. The sorting discharge unit 20 includes a subsidiary conveyance path 22, a change-over mechanism 23, a subsidiary discharge roller 24 and a subsidiary stacking tray 26. The subsidiary discharge roller 24 is provided on the most downstream side of the subsidiary conveyance path 22. The subsidiary stacking tray 26 is arranged above the main stacking tray 19 and the transfer sheet P discharged from the subsidiary discharge roller 24 is stacked in the subsidiary stacking tray 26. A stacking concave portion 29 which expands a stackable area of the subsidiary stacking tray 26 is formed below the subsidiary discharge roller 24.

1 Claim, 3 Drawing Sheets

(56) References Cited

U.S. PATENT DOCUMENTS

| | | | |
|---|---|---|---|
| 2004/0179859 A1* | 9/2004 | Ishii | 399/119 |
| 2005/0248085 A1* | 11/2005 | Sekiyama et al. | 271/293 |
| 2007/0286657 A1* | 12/2007 | Nagao et al. | 399/405 |
| 2009/0122330 A1* | 5/2009 | Andoh et al. | 358/1.13 |
| 2009/0162082 A1* | 6/2009 | Shiraki et al. | 399/43 |
| 2009/0169245 A1* | 7/2009 | Sato | 399/111 |
| 2009/0295083 A1* | 12/2009 | Kitan | 271/306 |
| 2009/0324285 A1* | 12/2009 | Otsuka et al. | 399/124 |
| 2010/0003048 A1* | 1/2010 | Yamazoe | 399/92 |
| 2010/0166474 A1* | 7/2010 | Suzuki | 399/405 |
| 2011/0229229 A1* | 9/2011 | Kajita | 399/330 |

\* cited by examiner

IMAGE FORMING APPARATUS

INCORPORATION BY REFERENCE

This application is based upon and claims the benefit of priority from the corresponding Japanese Patent Application No. 2012-064788, filed in the Japan Patent Office on Mar. 22, 2012, the entire contents of which are incorporated herein by reference.

BACKGROUND

The present disclosure relates to an image forming apparatus such as a copying machine, a printer, a multifunction peripheral, or the like.

A well-known image forming apparatus represented by a copying machine, a printer, a multifunction peripheral, or the like includes a plurality of conveyance paths which convey sheets, a discharge roller which is arranged on the most downstream side of each conveyance path to discharge a sheet, a plurality of stacking trays in which discharged sheets are stacked, and a change-over guide which changes over a conveyance destination of a sheet between respective conveyance paths.

In addition, there has been known an image forming apparatus in which the plurality of discharge rollers and the change-over guide are mounted inside its apparatus main body. Further, there has been also known an image forming apparatus in which the one discharge roller is mounted inside its apparatus main body, and the other discharge rollers and the change-over guide are mounted in a body internal space provided outside the apparatus main body.

In one of the above-described image forming apparatuse, when the discharge roller and the change-over guide are mounted on a post assembly stage, a cover has to be removed temporarily for that purpose. Thus, a problem that assembly performance thereof may drop occurs. Also, in the other image forming apparatus, the discharge roller and the change-over guide, which are to be mounted on the post assembly stage, are mounted on the downstream side relative to the discharge roller. Thus, when a user attempts to place sheets having a large size, which can be stacked in an optional stacking tray, the optional stacking tray may extend out of an apparatus main body or sheets may extend out of the apparatus main body. Consequently, a problem that the installation place of the image forming apparatus is limited occurs.

SUMMARY

To solve the above-described problem, the present disclosure relates to an image forming apparatus capable of accommodating sheets on each of which an image is formed in a body internal space of an apparatus main body thereof. The image forming apparatus includes a main conveyance path, a main discharge roller, and a main stacking tray. The main conveyance path conveys the sheets. The main discharge roller is provided on the most downstream side of the main conveyance path. The main stacking tray is arranged on the bottom of the body internal space and the sheet discharged by the main discharge roller is stacked thereon. The sorting discharge unit including a subsidiary conveyance path, a change-over mechanism, a subsidiary discharge roller, and a subsidiary stacking tray is mountable on a downstream side with respect to the main discharge roller. The sheet is conveyed to the subsidiary conveyance path. The change-over mechanism is arranged on the most upstream side of the subsidiary conveyance path to change a conveyance destination of the sheet between the main stacking tray and the subsidiary stacking tray. The subsidiary discharge roller is provided on the most downstream side of the subsidiary conveyance path. The subsidiary stacking tray is arranged above the main stacking tray and the sheet discharged from the subsidiary discharge roller is stacked thereon. A stacking concave portion which expands a stackable area of the subsidiary stacking tray is formed below the subsidiary discharge roller.

DETAILED DESCRIPTION

Figure 1:
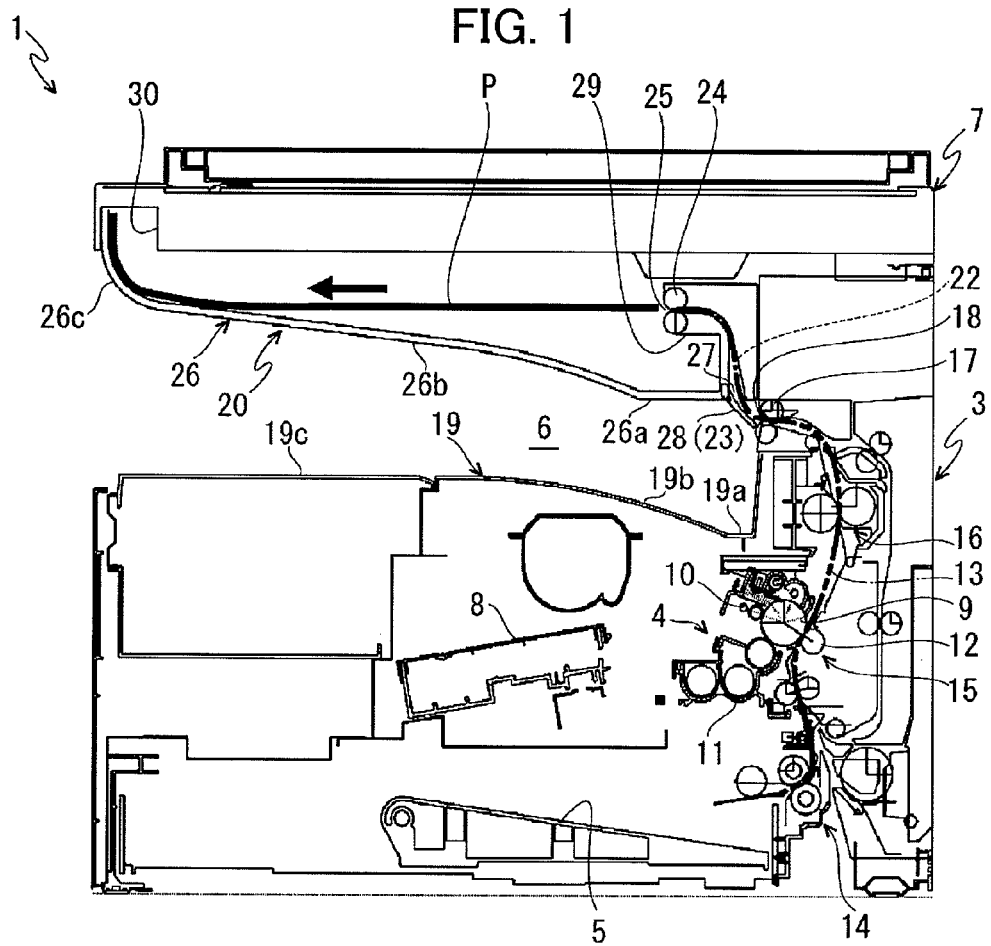
FIG. 1 is a longitudinal sectional view showing a state in which a sheet has been conveyed to a sub-stacking tray of the image forming apparatus according to an embodiment of the present disclosure.
Figure 2:
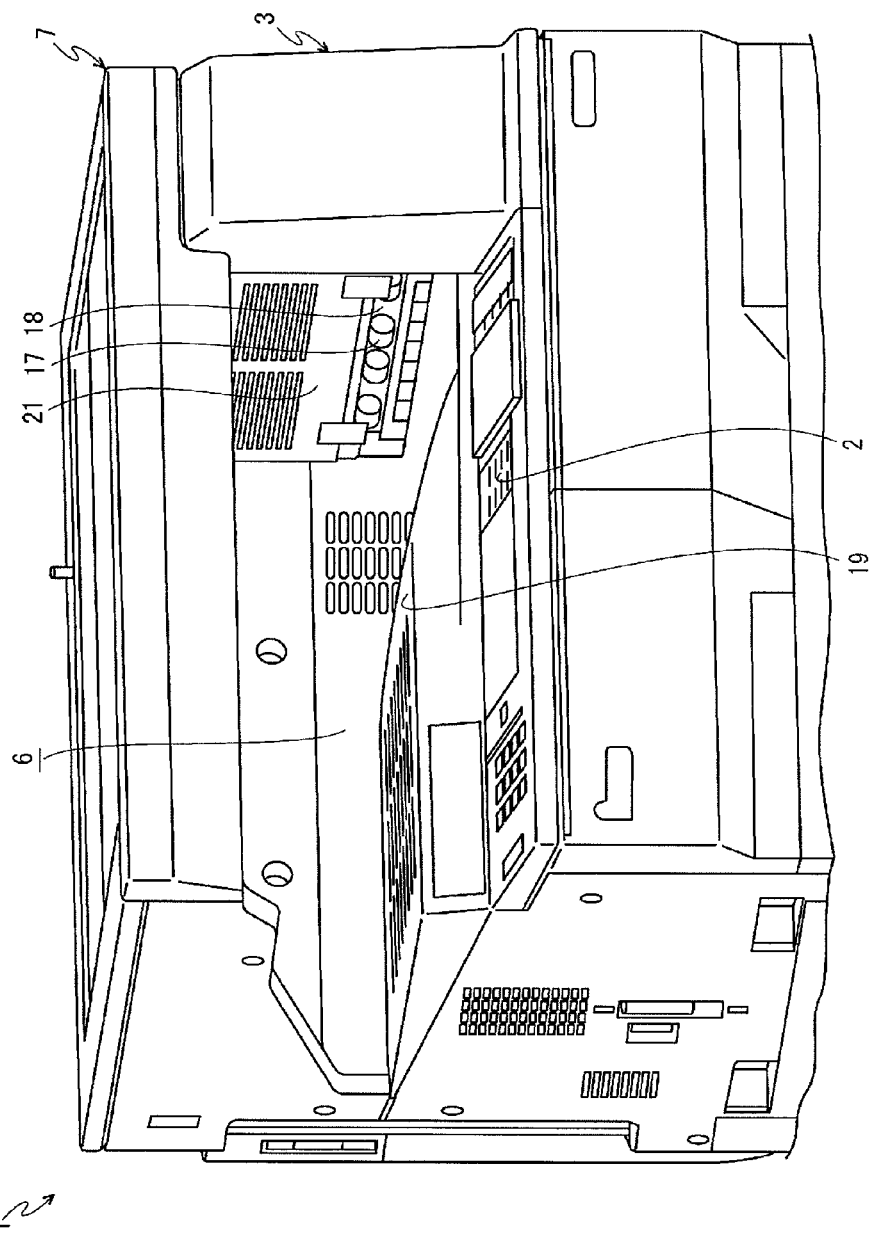
FIG. 2 is a perspective view showing a state in which a sorting discharge unit has been removed from the image forming apparatus according to the embodiment of the present disclosure.

An entire structure of a multifunction peripheral 1, which is an image forming apparatus, will be described with reference to FIGS. 1, 2. FIG. 1 is a longitudinal sectional view showing a state in which a sheet has been conveyed to a sub-stacking tray of the image forming apparatus according to the present embodiment. FIG. 2 is a perspective view showing a state in which the sorting discharge unit has been removed. In a following description, an indicated side on the drawing of FIG. 1 is referred to as a front side of each component for convenience for description.

The multifunction peripheral 1 includes a box type apparatus main body 3 which has an operation panel unit 2 (see FIG. 2) provided on a front surface thereof as shown in FIG. 1 and FIG. 2. A sheet cassette 5 configured to accommodate transfer sheets P as the print sheet is provided below an image forming unit 4 arranged inside the apparatus main body 3. An image reading unit 7 which contains an exposure lamp or charge-coupled device (CCD) is provided above the image forming unit 4 and above the body internal space 6. The operation panel 2 includes a touch panel, a start key, a ten-key and the like, which are operated when each of various settings, copy function or facsimile function is used.

As shown in FIG. 1, the image forming unit 4 includes an exposure device 8, a photosensitive drum 9, a charger 10, a developing device 11, and a transfer roller 12. The exposure device 8 is constituted of a laser scanning unit (LSU). The photosensitive drum 9 is provided on the right of the exposure device 8 such that it is rotatable counterclockwise in FIG. 1. The charger 10 is provided near the circumference of the photosensitive drum 9.

A main conveyance path 13 (indicated with two-dot chain line in the figure) for the transfer sheet P is provided on one side of the apparatus main body 3 (right side thereof in the drawing). A paper feed unit 14 is provided at the upstream end of the main conveyance path 13. A transfer unit 15, which is opposed to the photosensitive drum 9, is provided in a middle stream portion of the main conveyance path 13. A fixing unit 16 is provided on the downstream portion of the main conveyance path 13. A main discharge roller 17 is provided on the most downstream side of the main conveyance path 13. A discharge port 18 is provided at the downstream end of the main conveyance path 13.

A main stacking tray 19 is arranged on the bottom of the body internal space 6 and a sorting discharge unit 20 is arranged on the upper portion of the body internal space 6. The sorting discharge unit 20 can be mounted on a multifunction peripheral without changing the structure of the conventional multifunction peripheral. The sorting discharge unit 20 is inserted into the body internal space 6 from the front side (indicated side on the drawing of FIG. 2) and mounted in the body internal space 6 outside a sealing cover 21 (see FIG. 2) which covers an area above the discharge port 18.

The main stacking tray 19 is arranged on the downstream side (left lower side on the drawing) with respect to the main discharge roller 17. The transfer sheet P discharged from the main conveyance path 13 by the main discharge roller 17 is placed in the main stacking tray 19. An upper surface of the main stacking tray 19 has a flat surface 19a, a rising slope surface 19b and a flat surface 19c, which are arranged in succession in a direction downstream. The inclination angle of the rising slope surface 19b gradually decreases as the rising slope surface advances in a direction downstream (toward the left on the drawing). In other words, the slope surface 19b of the main stacking tray 19 is inclined downward as the slope surface advances upstream (toward the right on the drawing).

The sorting discharge unit 20 includes a subsidiary conveyance path 22 (indicated with a dashed line in the figure), a change-over mechanism 23, a subsidiary discharge roller 24, a discharge port 25, and a subsidiary stacking tray 26, which are integrated into a single unit. The subsidiary conveyance path 22 conveys the transfer sheet P discharged from the main discharge roller 17. The change-over mechanism 23 is provided on the most upstream side of the subsidiary conveyance path 22. The subsidiary discharge roller 24 is provided on the most downstream side of the subsidiary conveyance path 22. The discharge port 25 is provided at the downstream end of the subsidiary conveyance path 22. The subsidiary stacking tray 26 is arranged on the downstream side with respect to the subsidiary discharge roller 24 (on the left lower side in the figure).

The subsidiary conveyance path 22 is provided on one side (right side in the figure) of the sorting discharge unit 20. A paper feed port 27 is provided at an upstream end of the subsidiary conveyance path 22, the paper feed port 27 being constructed in an upward direction from a place slightly downstream (on the left on the drawing) with respect to the discharge port 18. The subsidiary discharge roller 24 is provided on the most downstream side of the subsidiary conveyance path 22. The discharge port 25 is provided at the downstream end of the subsidiary conveyance path 22 such that it faces sideways (rightward in the drawing). Thus, the subsidiary conveyance path 22 is formed such that after rising from the paper feed port 27, it is bent sideways (leftward in the drawing) and reaches the discharge port 25.

The change-over mechanism 23 has a change-over guide 28 which swings when a motor (not shown) or the like is driven. A fixed end of the change-over guide 28 is pivotally supported by an edge off the main discharge roller 17 in the paper feed port 27. The change-over guide 28 is mounted such that a free end thereof is directed to the main discharge roller 17. The change-over mechanism 23 directs the free end of the change-over guide 28 sideways (rightward on the drawing) to close the paper feed port 27 thereby guiding the transfer sheet P to the main stacking tray 19. Further, the change-over mechanism 23 directs the free end of the change-over guide 28 obliquely sideways and downward to open the paper feed port 27 thereby leading the transfer sheet P to the subsidiary conveyance path 22 (see FIG. 1).

A stacking concave portion 29 is formed under the subsidiary discharge roller 24. The stacking concave portion 29 is formed in such a shape as if a portion under the subsidiary discharge roller 24 is cut out sideways (rightward on the drawing) from just under the subsidiary discharge roller 24 up to just before the subsidiary conveyance path 22.

The subsidiary stacking tray 26 is arranged above the main stacking tray 19. The transfer sheet P discharged from the subsidiary conveyance path 22 by the subsidiary discharge roller 24 is placed in the subsidiary stacking tray 26. The above-described stacking concave portion 29 is provided on an upstream side (on the right on the drawing) of the subsidiary stacking tray 26 and the downstream end of the subsidiary stacking tray 26 is bent upward. As a result, an upper surface of the subsidiary stacking tray 26 has a flat surface 26a, a rising slope surface 26b and a curved surface 26c, which are arranged in succession in a direction downstream. The flat surface 26a extends from just below (rightward below on the drawing) the subsidiary discharge roller 24 toward the downstream side (leftward on the drawing). The slope angle of the rising slope surface 26b gradually decreases as it extends in a direction downstream from below (leftward below on the drawing) the subsidiary discharge roller 24 up to slightly above the height of the subsidiary discharge roller 24. The curved surface 26c is curved upward at a predetermined curvature. In other words, in the subsidiary stacking tray 26, the rising slope surface 26b and the curved surface 26c are inclined downward toward the upstream side (rightward on the drawing). The stackable area of the subsidiary stacking tray 26 formed in the above-described manner is expanded by the stacking concave portion 29 and the curved surface 26c.

A concave portion 30 which is dented upward is formed at the downstream end of the subsidiary stacking tray 26 of the image reading unit 7. The dented portion 30 accommodates the downstream end of the subsidiary stacking tray 26 and further accommodates the downstream end of a transfer sheet P which has advanced up to the downstream end of the subsidiary stacking tray 26.

Next, an image forming operation of the multifunction peripheral 1 having such a structure will be described. When the multifunction peripheral 1 is powered on, respective parameters are initialized so that an initial setting such as temperature setting of the fixing unit 16 is executed. Then, when image data is input to the multifunction peripheral 1 from a computer or the like connected to the multifunction peripheral 1 and a print start instruction is dispatched, the image forming operation is executed as described below.

First, a user sets an original document on the image reading unit 7, performs various settings about a number of prints, magnification and the like, and presses the start key. Then, the image reading unit 7 reads an image from the original document and the exposure device 8 irradiates the photosensitive drum 9 which rotates counterclockwise in FIG. 1 with laser beam based on the image data. Because the surface of the photosensitive drum 9 is charged equally by the charger 10 preliminarily, a portion irradiated with laser beam of the surface of the photosensitive drum 9 loses charge. Consequently, an electrostatic latent image corresponding to the image data is formed on the photosensitive drum 9. The developing device 11 develops this electrostatic latent image and forms a toner image on the photosensitive drum 9.

Next, a transfer sheet P picked out from the sheet cassette 5 by the paper feed unit 14 is conveyed to the transfer unit 15 at the same timing as the above-described image forming operation. Then, in the transfer unit 15, the toner image on the photosensitive drum 9 is transferred to the transfer sheet P by the transfer roller 12. After the toner image is transferred, the transfer sheet P is conveyed downstream through the main conveyance path 13 and enters the fixing unit 16. The toner image is fixed to the transfer sheet P by the fixing unit 16. The transfer sheet P on which the toner image is fixed is discharged into the body internal space 6 from the discharge port 18.

Next, an operation of the multifunction peripheral 1 loaded with the sorting discharge unit 20 will be described. When the change-over guide 28 is changed to a position in which it opens the paper feed port 27, the transfer sheet P discharged to the body internal space 6 from the main conveyance path 13 by the main discharge roller 17 is guided by the change-over guide 28, so that it is stacked on the main stacking tray 19. Contrary to this, when the change-over guide 28 is changed to a position in which it closes the paper feed port 27, the transfer sheet discharged to the body internal space 6 is guided by the change-over guide 28 and conveyed to the discharge port 25 through the subsidiary conveyance path 22 from the paper feed port 27. After that, the transfer sheet P is discharged sideways (leftward on the drawing) by the subsidiary discharge roller 24 (in a direction indicated with a thick arrow in the figure).

Figure 3:
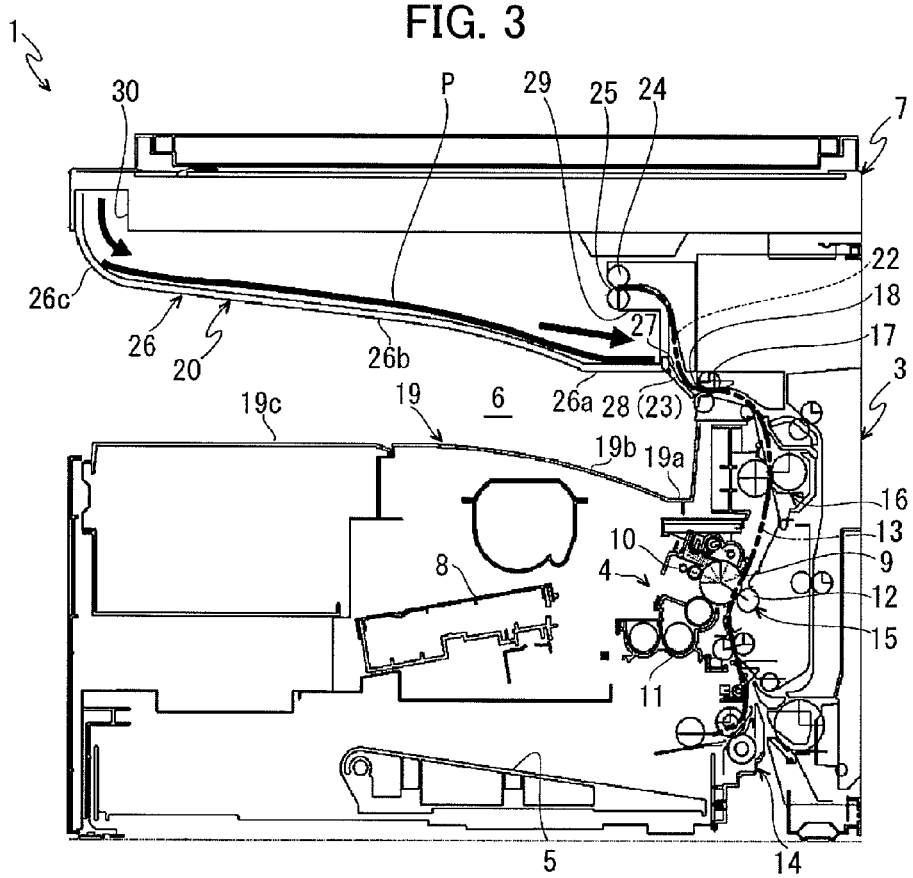
FIG. 3 is a longitudinal sectional view showing a state in which sheets are stacked in the sub-stacking tray of the image forming apparatus of the embodiment of the present disclosure.

When a transfer sheet P having a large size, which can be stacked in the main stacking tray 19, is used, the downstream end of the transfer sheet P makes contact with the curved surface 26c of the rising slope surface 26b and after that, slides along the rising slope surface 26b. Then, the transfer sheet P reaches the downstream end of the subsidiary stacking tray 26 in such a state in which it is curved along the shape of the curved surface 26c as shown in FIG. 1. On the other hand, the upstream end of the transfer sheet P lowers downward at a timing when an entire area of the transfer sheet P is discharged from the discharge port 28 and falls down to the vicinity of a boundary between the flat surface 26a and the rising slope surface 26b. With this state, the transfer sheet P moves in a direction upstream (in a direction of the thick arrow in the figure) by a restoration force of the downstream end of the curved transfer sheet P which attempts to get back to its original state as shown in FIG. 3. As a consequence, the transfer sheet P is stacked such that the downstream end thereof does not extend out of the subsidiary stacking tray 26 and the upstream end thereof is placed on the flat surface 26a.

According to the present embodiment, the stackable area of the subsidiary stacking tray 26 is expanded by the stacking concave portion 29. Further, the transfer sheet P can be stacked in a state in which the downstream end thereof is curved upward along the shape of the subsidiary stacking tray 26 and can be moved in a direction upstream by the restoration force of the transfer sheet P which attempts to get back to its original state. Further, the downstream end of the transfer sheet P can be accommodated in the concave portion 30. Consequently, even when a transfer sheet P having a large size which can be stacked in the main stacking tray 19 is stacked in the subsidiary stacking tray 26, the downstream end of the transfer sheet is kept from extending out of the subsidiary stacking tray, thereby preventing the downstream end of the transfer sheet P from being stacked such that it extends out of the subsidiary stacking tray 26.

In addition, the sorting discharge unit 20 including the subsidiary conveyance path 22, the change-over mechanism 23, the subsidiary discharge roller 24, and the subsidiary stacking tray 26 in a single unit can be mounted in the body internal space 6 outside the sealing cover 21 which covers an area above the discharge port 18. Thus, the sorting discharge unit 20 can be attached to a conventional apparatus main body optionally and thereby its assembly performance can be improved. Further, by keeping the transfer sheet P from extending out of the apparatus main body when the stacking tray is attached optionally, the degree of freedom in selecting the installation place of the multifunction peripheral 1 as an image forming apparatus can be increased and the assembly performance of the sorting discharge unit 20 to the apparatus main body can be improved.

The invention claimed is:

1. An image forming apparatus capable of accommodating a sheet on which an image is formed in a body internal space of an apparatus main body thereof, the image forming apparatus comprising: a main conveyance path configured to convey the sheet;
   a main discharge roller provided on a most downstream side of the main conveyance path; and
   a main stacking tray arranged on a bottom of the body internal space and on which the sheet discharged by the main discharge roller is stacked, wherein
   a sorting discharge unit including a subsidiary conveyance path configured to convey the sheet, a change-over mechanism arranged on a most upstream side of the subsidiary conveyance path to change a conveyance destination of the sheet between the main stacking tray and a subsidiary stacking tray, a subsidiary discharge roller provided on a most downstream side of the subsidiary conveyance path, and the subsidiary stacking tray arranged above the main stacking tray and on which the sheet discharged from the subsidiary discharge roller is stacked, is mountable on a downstream side with respect to the main discharge roller,
   a stacking concave portion which expands a stackable area of the subsidiary stacking tray is formed below the subsidiary discharge roller,
   an image reading unit arranged above the body internal space to read an image from an original document, and
   a concave portion formed above a downstream end of the subsidiary stacking tray of the image reading unit, wherein the downstream end of the subsidiary stacking tray is curved upward, the concave portion being dented upward.

* * * * *